(12) United States Patent
Dalmatov

(10) Patent No.: US 11,402,998 B2
(45) Date of Patent: Aug. 2, 2022

(54) RE-PLACING DATA WITHIN A MAPPED-RAID ENVIRONMENT COMPRISING SLICES, STORAGE STRIPES, RAID EXTENTS, DEVICE EXTENTS AND STORAGE DEVICES

(71) Applicant: EMC IP Holding Company LLC, Hopkinton, MA (US)

(72) Inventor: Nickolay Alexandrovich Dalmatov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 815 days.

(21) Appl. No.: 16/078,360

(22) PCT Filed: Apr. 27, 2017

(86) PCT No.: PCT/RU2017/000273
§ 371 (c)(1),
(2) Date: Aug. 21, 2018

(87) PCT Pub. No.: WO2018/199794
PCT Pub. Date: Nov. 1, 2018

(65) Prior Publication Data
US 2021/0191619 A1    Jun. 24, 2021

(51) Int. Cl.
*G06F 3/06* (2006.01)
(52) U.S. Cl.
CPC .......... *G06F 3/0614* (2013.01); *G06F 3/0611* (2013.01); *G06F 3/0647* (2013.01); *G06F 3/0689* (2013.01)
(58) Field of Classification Search
CPC .... G06F 3/0647; G06F 3/0614; G06F 3/0611; G06F 3/0689; G06F 3/0665
See application file for complete search history.

(56) References Cited

U.S. PATENT DOCUMENTS

| 5,345,584 A | 9/1994 | Hill |
| 5,734,861 A | 3/1998 | Cohn et al. |

(Continued)

FOREIGN PATENT DOCUMENTS

WO    20160072971    5/2016

OTHER PUBLICATIONS

EMC, "EMC Celerra Automated Storage Tiering Applied Best Practices Guide", Aug. 2009, P/N h6499, pp. 1-36.

(Continued)

*Primary Examiner* — Chie Yew
(74) *Attorney, Agent, or Firm* — BainwoodHuang

(57) ABSTRACT

A technique balances data storage activity within a mapped-RAID environment. The technique involves selecting, by processing circuitry, a source slice of storage from multiple slices of storage of the mapped-RAID environment, the source slice containing particular data to be relocated. The technique further involves selecting, by the processing circuitry, a destination slice of storage from the multiple slices of storage of the mapped-RAID environment. The technique further involves relocating, by the processing circuitry, the particular data from the source slice to the destination slice to balance data storage activity within the mapped-RAID environment. The mapped-RAID environment includes multiple storage devices. Each storage device provides multiple non-overlapping device extents. Each slice of the multiple slices of storage of the mapped-RAID environment is formed of storage stripes extending across device extents provided by a group of storage devices that includes less than all of the storage devices of the mapped-RAID environment.

22 Claims, 5 Drawing Sheets

(56) References Cited

U.S. PATENT DOCUMENTS

| | | |
|---|---|---|
| 6,173,306 B1 | 1/2001 | Raz et al. |
| 8,706,960 B1 | 4/2014 | Ives et al. |
| 8,832,363 B1* | 9/2014 | Sundaram .............. G06F 3/0644 |
| | | 714/6.22 |
| 8,935,493 B1 | 1/2015 | Dolan et al. |
| 9,311,002 B1 | 4/2016 | Scott et al. |
| 9,330,105 B1 | 5/2016 | Duprey et al. |
| 9,383,940 B1 | 7/2016 | Ives et al. |
| 9,594,514 B1 | 3/2017 | Bono et al. |
| 9,684,593 B1 | 6/2017 | Chen et al. |
| 9,703,664 B1 | 7/2017 | Alshawabkeh et al. |
| 9,940,033 B1 | 4/2018 | Alshawabkeh et al. |
| 9,965,218 B1 | 5/2018 | Martin et al. |
| 10,025,523 B1 | 7/2018 | Dagan et al. |
| 10,073,621 B1 | 9/2018 | Foley et al. |
| 10,078,569 B1 | 9/2018 | Alshawabkeh et al. |
| 10,089,026 B1 | 10/2018 | Puhov et al. |
| 10,095,425 B1 | 10/2018 | Martin |
| 10,126,988 B1 | 11/2018 | Han et al. |
| 10,140,041 B1 | 11/2018 | Dong et al. |
| 10,146,447 B1 | 12/2018 | Dong et al. |
| 10,146,456 B1 | 12/2018 | Gao et al. |
| 10,146,459 B1 | 12/2018 | Gao et al. |
| 10,146,624 B1 | 12/2018 | Gong et al. |
| 10,146,646 B1 | 12/2018 | Foley et al. |
| 10,152,254 B1 | 12/2018 | Kang et al. |
| 2002/0095532 A1 | 7/2002 | Surugucchi et al. |
| 2003/0065883 A1 | 4/2003 | Bachmat |
| 2006/0161807 A1 | 7/2006 | Dawkins |
| 2006/0212746 A1 | 9/2006 | Amegadzie et al. |
| 2008/0028164 A1 | 1/2008 | Ikemoto et al. |
| 2008/0059749 A1 | 3/2008 | Gerber et al. |
| 2008/0109601 A1 | 5/2008 | Klemm et al. |
| 2010/0250501 A1 | 9/2010 | Mandagere et al. |
| 2011/0047321 A1* | 2/2011 | Taguchi .............. H04L 67/1097 |
| | | 711/103 |
| 2011/0066767 A1* | 3/2011 | Hyde, II .............. G06F 3/0613 |
| | | 710/18 |
| 2011/0167236 A1* | 7/2011 | Orikasa ................ G06F 3/0685 |
| | | 711/165 |
| 2012/0259901 A1 | 10/2012 | Lee et al. |
| 2013/0067187 A1* | 3/2013 | Moss .................. G06F 12/0223 |
| | | 711/170 |
| 2013/0275653 A1 | 10/2013 | Ranade et al. |
| 2014/0095439 A1 | 4/2014 | Ram |
| 2014/0317346 A1* | 10/2014 | Moon .................. G06F 3/0665 |
| | | 711/114 |
| 2015/0134926 A1 | 5/2015 | Yang et al. |
| 2016/0188401 A1 | 6/2016 | Shen et al. |
| 2016/0196075 A1* | 7/2016 | Matsushita .......... G06F 3/0688 |
| | | 711/103 |
| 2016/0364149 A1 | 12/2016 | Klemm et al. |
| 2017/0285972 A1 | 10/2017 | Dalmatov |
| 2018/0121129 A1* | 5/2018 | Sawhney .............. G06F 3/0604 |

OTHER PUBLICATIONS

EMC, "EMC VNX@ Unified Best Practices for Performance Applied Best Practice Guide", Oct. 2005, P/N H10938.8, pp. 1-37.

EMC, "Managing Data Relocation in Storage Systems", U.S. Appl. No. 13/929,664, filed Jun. 27, 2013.

Tomek, "EMC VNX-Fast VP Explained—Storage Freak", retrieved from http://www.storagefreak.net/2014/06/emc-vnx-fast-vp-explained, Jun. 2, 2014, pp. 1-6.

International Search Report and the Written Opinion from International Searching Authority (RU) for International Application No. PCT/RU2017/000273, dated Jan. 25, 2018, 7 pages.

* cited by examiner

RE-PLACING DATA WITHIN A MAPPED-RAID ENVIRONMENT COMPRISING SLICES, STORAGE STRIPES, RAID EXTENTS, DEVICE EXTENTS AND STORAGE DEVICES

BACKGROUND

A conventional data storage system presents a mapped logical unit of storage (LUN) for block-level access. The mapped LUN includes slices of storage that are formed from physical drives configured as a redundant array of independent disk (RAID) group. For example, in accordance with RAID Level 5, each block-level data stripe (multiple data blocks and a parity block) extends across all of the physical drives of the RAID group (one block being placed on each physical drive), and these data stripes form slices of storage of the LUN.

During operation, the data storage system may move slices of data between RAID groups of different storage tiers. For example, the data storage system may promote a frequently accessed slice of data to a first RAID group in a solid state memory storage tier (i.e., a fast tier) from a second RAID group in a magnetic memory storage tier (i.e., a slow tier) to reduce access latency for that slice of data. Additionally, the data storage system may demote a slice of data that is infrequently accessed from first RAID group in the solid state memory storage tier to the second RAID group in the magnetic memory storage tier to free up storage space within the solid state memory storage tier.

SUMMARY

Unfortunately, there are deficiencies to the above-described conventional data storage system in which each block-level data stripe extends across all of the physical drives of the RAID group. For example, in response to failure of a physical drive, such a data storage system requires excessive access to a new physical drive during data restoration. Such access results in relatively long data restoration time thus leaving the data storage system vulnerable to data loss if second physical drive fails before data restoration completes.

However, suppose that the data is stored in a mapped-RAID environment instead of the above-described conventional data storage system in which each block-level data stripe extends across all of the physical drives of the RAID group. Although data restoration may complete faster in the mapped-RAID environment since the restored data may be written across more than one existing storage device rather than a single new storage device, the mapped-RAID environment may provide uneven input/output (I/O) loading and/or wearing of storage devices. That is, the mapped-RAID environment may form imbalances (e.g., hot spots) since each block-level data stripe does not extend across all of the physical drives of the RAID group. If there is no compensation provided for these imbalances, latency to overloaded storage devices that form hot spots may be sub-optimal and these overloaded storage devices may fail prematurely.

In contrast to the above-described conventional data storage system in which each block-level data stripe extends across all of the physical drives of the RAID group, improved techniques are directed to re-placing (or relocating) data within a mapped-RAID environment to provide improved I/O load and wear balancing among storage devices. In particular, such techniques identify imbalances (e.g., heavily accessed slices of data) and move the imbalances among the storage devices of the mapped-RAID environment (e.g., redistribute the heavily accessed slices of data). Such operation statistically balances the storage devices in terms of I/O performance and wearing thus reducing overall latency and reducing failures due to premature wear.

One embodiment is directed to a method of balancing data storage activity within a mapped-RAID environment. The method includes selecting, by processing circuitry, a source slice of storage from multiple slices of storage of the mapped-RAID environment, the source slice containing particular data to be relocated. The method further includes selecting, by the processing circuitry, a destination slice of storage from the multiple slices of storage of the mapped-RAID environment. The method further includes relocating, by the processing circuitry, the particular data from the source slice to the destination slice to balance data storage activity within the mapped-RAID environment. The mapped-RAID environment includes multiple storage devices. Each storage device provides multiple non-overlapping device extents. Each slice of the multiple slices of storage of the mapped-RAID environment is formed of storage stripes extending across device extents provided by a group of storage devices that includes less than all of the storage devices of the mapped-RAID environment.

In some arrangements, the method further includes, prior to selecting the source slice and the destination slice, performing a set of input/output (I/O) operations that accesses the particular data while the particular data resides in the source slice. In these arrangements, the method further includes updating, in response to performing the set of I/O operations, a set of statistics that tracks data storage activity of the mapped-RAID environment.

In some arrangements, selecting the source slice of storage from the multiple slices of storage of the mapped-RAID environment includes identifying the source slice among other slices of the mapped-RAID environment based on the set of statistics that tracks data storage activity of the mapped-RAID environment indicating that the source slice has experienced higher data storage activity than the other slices of the mapped-RAID environment.

In some arrangements, selecting the destination slice of storage from the multiple slices of storage of the mapped-RAID environment includes identifying the destination slice among the other slices of the mapped-RAID environment based on the set of statistics that tracks data storage activity of the mapped-RAID environment indicating that the destination slice has experienced less data storage activity than the other slices of the mapped-RAID environment.

In some arrangements, the method further includes, while performing the set of I/O operations that accesses the particular data while the particular data resides in the source slice, maintaining an initial set of address mappings that map a portion of a logical unit of storage (LUN), which is addressable by a set applications, to the source slice.

In some arrangements, the method further includes, upon relocating the particular data from the source slice to the destination slice, maintaining a subsequent set of address mappings that map the portion of the LUN to the destination slice.

In some arrangements, the method further includes, after relocating the particular data from the source slice to the destination slice, performing another set of I/O operations that accesses the particular data while the particular data resides in the destination slice. In these arrangements, the method further includes updating the set of statistics that tracks data storage activity of the mapped-RAID environment in response to performing the other set of I/O operations.

Another embodiment is directed to data storage equipment which includes a communications interface, memory, and control circuitry coupled to the communications interface and the memory. The memory includes a mapped-RAID environment having multiple storage devices, each storage device providing multiple non-overlapping device extents. The memory stores instructions which, when carried out by the control circuitry, cause the control circuitry to:
(A) select a source slice of storage from multiple slices of storage of the mapped-RAID environment, the source slice containing particular data to be relocated,
(B) select a destination slice of storage from the multiple slices of storage of the mapped-RAID environment, and
(C) relocate the particular data from the source slice to the destination slice to balance data storage activity within the mapped-RAID environment, each slice of the multiple slices of storage of the mapped-RAID environment being formed of storage stripes extending across device extents provided by a group of storage devices that includes less than all of the storage devices of the mapped-RAID environment.

Yet another embodiment is directed to a computer program product having a non-transitory computer readable medium which stores a set of instructions to balance data storage activity within a mapped-RAID environment. The set of instructions, when carried out by computerized circuitry, causing the computerized circuitry to perform a method of:
(A) selecting a source slice of storage from multiple slices of storage of the mapped-RAID environment, the source slice containing particular data to be relocated;
(B) selecting a destination slice of storage from the multiple slices of storage of the mapped-RAID environment; and
(C) relocating the particular data from the source slice to the destination slice to balance data storage activity within the mapped-RAID environment, the mapped-RAID environment including multiple storage devices, each storage device providing multiple non-overlapping device extents, each slice of the multiple slices of storage of the mapped-RAID environment being formed of storage stripes extending across device extents provided by a group of storage devices that includes less than all of the storage devices of the mapped-RAID environment.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in re-placing data within a mapped-RAID environment.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to relocating (or moving) data within a mapped-RAID environment to provide improved input/output (I/O) performance and wear balancing among storage devices. Along these lines, such a technique identifies imbalances (e.g., heavily accessed slices of data) and moves that data among the storage devices (e.g., redistributes the heavily accessed slices of data to less frequently accessed locations). Such operation statistically balances the storage devices in terms of I/O loading and wearing thus reducing overall latency and reducing failures due to premature wear.

Figure 1:
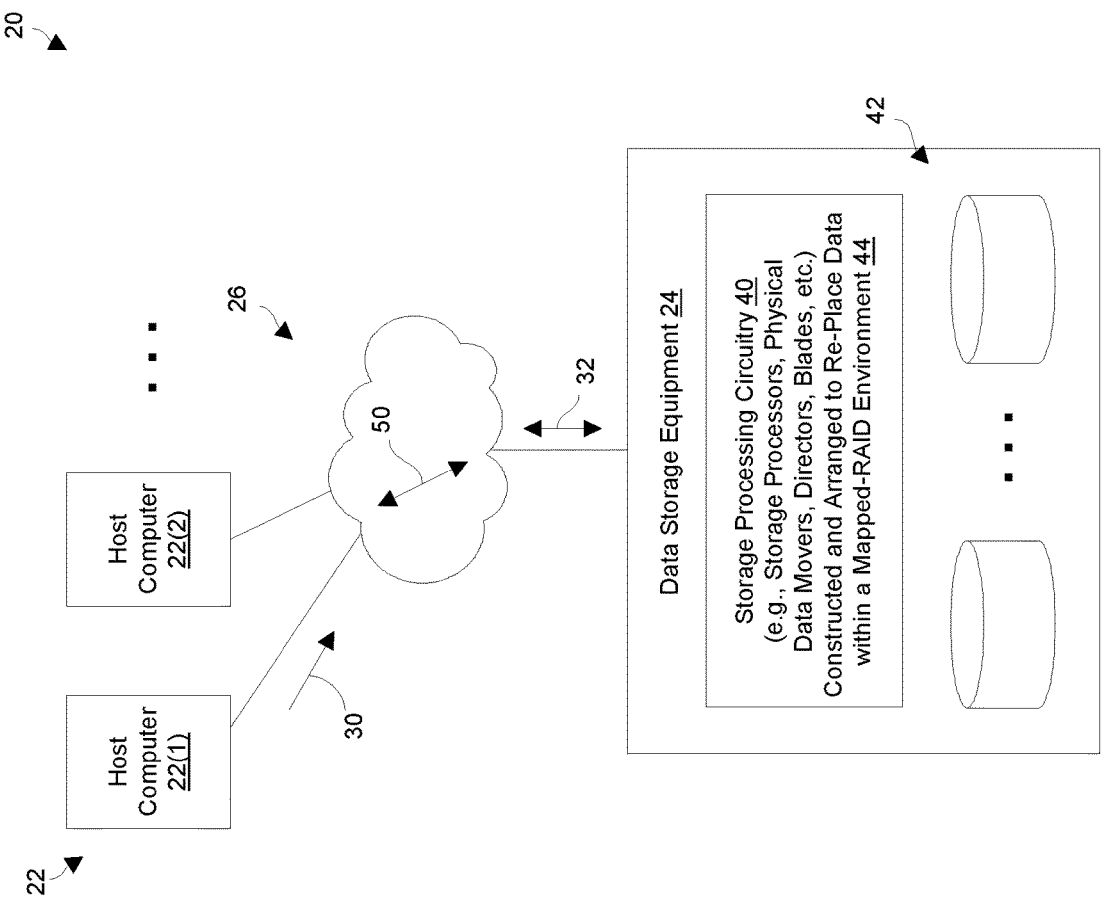
FIG. 1 is a block diagram of a data storage setting which re-places data within a mapped-RAID environment.

FIG. 1 is a block diagram of a data storage setting (or environment) 20 which relocates (or re-places) data within a mapped-RAID environment. The data storage setting 20 includes host computers 22(1), 22(2), . . . (collectively, host computers 22), data storage equipment 24, and a communications medium 26.

Each host computer 22 is constructed and arranged to perform useful work. For example, a host computer 22 may operate as a web server, a file server, an email server, an enterprise server, combinations thereof, and so on, which provides I/O requests 30 (e.g., small computer system interface or SCSI commands) to the data storage equipment 24. Such I/O requests 30 direct the data storage equipment 24 to store and retrieve host data 32 on behalf of the host computers 22.

The data storage equipment 24 includes storage processing circuitry 40 and an array of storage devices 42. The storage processing circuitry 40 may include one or more physical storage processors or engines, data movers, director boards, blades, I/O modules, storage drive controllers, switches, other hardware, combinations thereof, and so on. The storage processing circuitry 40 is constructed and arranged to provide a variety of data storage system services. For example, the storage processing circuitry 40 processes the I/O requests 30 from the host computers 22 by robustly and reliably storing host data 32 (and associated metadata) in a mapped-RAID environment 44 provided by the array of storage devices 42 and retrieving the host data 32 from the mapped-RAID environment 44. Additionally, the storage processing circuitry 40 moves data between different slices of the mapped-RAID environment 44 to provide even I/O loading and wear. Accordingly, I/O latency and failures due to premature wearing are reduced.

The communications medium 26 is constructed and arranged to connect the various components of the data storage setting 20 together to enable these components to communicate via exchanging electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic communications devices and cabling, wireless communication devices, combinations thereof, etc. Furthermore, the communications medium 26 is capable of supporting SAN-based communications, LAN-based communications, cellular communications, WAN-based communications, distributed infrastructure communications, other topologies, combinations thereof, etc.

During operation, the storage processing circuitry 40 of the data storage equipment 24 writes host data 32 to the array of storage devices 42 and reads host data 32 from the array of storage devices 42 in response to the I/O requests 30. Routinely, the storage processing circuitry 40 re-places data (e.g., host data 32, metadata, etc.) among slices of the mapped-RAID environment 44 to more evenly distribute loading and wear. As a result, there is lower I/O latency and fewer failures due to premature wearing. Further details will now be provided with reference to FIG. 2.

Figure 2:
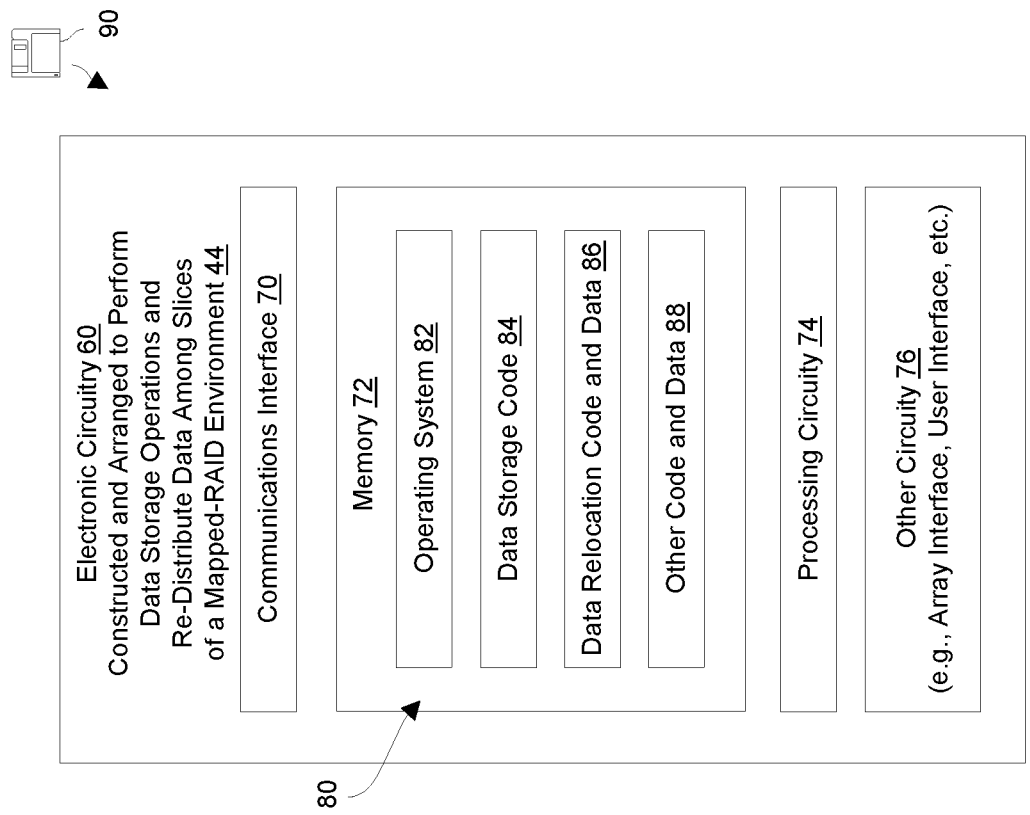
FIG. 2 is a block diagram of data storage equipment of the data storage setting of FIG. 1.

FIG. 2 shows particular details of electronic circuitry 60 which forms the storage processing circuitry 40 of the data storage equipment 24 (also see FIG. 1) in accordance with certain embodiments. As shown, the electronic circuitry 60 includes a communications interface 70, memory 72, and processing circuitry 74, and other circuitry 76.

The communications interface 70 is constructed and arranged to connect the data storage equipment 24 to the communications medium 26 (also see FIG. 1) to enable electronic communications with other devices of the data storage setting 20 (e.g., the host computers 22). Such communications may be SAN-based, IP-based, cellular-based, cable-based, fiber-optic based, wireless, cloud-based, combinations thereof, and so on. Accordingly, the communications interface 70 enables the data storage equipment 24 to robustly and reliably communicate with other external apparatus.

The memory 72 is intended to represent both volatile storage (e.g., DRAM, SRAM, etc.) and non-volatile storage (e.g., flash memory, magnetic memory, etc.). In some arrangements, the memory 72 utilizes a portion of the array of storage devices 42 (FIG. 1). The memory 72 stores a variety of software constructs 80 including operating system code 82, data storage code 84, data relocation code and data 86, as well as other code and data 88.

The operating system code 82 refers to an operating system which is involved in controlling various electronic resources of the data storage equipment 24. For example, the operating system manages/allocates processor cycles, memory space, application installations, access control and privileges, and so on.

The data storage code 84 refers to the instructions that are involved in routine data storage operations (e.g., write and read operations). The data storage code 84 may include operating parameters, drivers, other metadata, etc. that form one or more portions of the I/O stack, mapping tables, and so on. In some arrangements, the data storage code 84 is tightly integrated with the operating system code 82 (e.g., a kernel).

The data relocation code and data 86 refers to specialized instructions that identify source slices containing data for relocation, and then relocate that data. In some arrangements, the data relocation code and data 86 includes a database which stores a set of statistics that tracks data storage activity of the mapped-RAID environment 44. Such statistics are then used to identify candidate source and destination slices for re-placement.

The other code and data 88 refers to various other instructions, parameters, data, etc. For example, the data storage equipment 24 may be equipped with other tools and utilities, user-level applications, and so on.

The processing circuitry 74 is constructed and arranged to operate in accordance with the various software constructs 80 stored in the memory 72. As will be explained in further detail shortly, the processing circuitry 74 executes code of the various software constructs 80 to form specialized circuitry that concurrently carries out data storage operations as well as perform data redistribution operations.

Such processing circuitry 74 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the electronic circuitry 60. In particular, the computer program product 90 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, DVD, flash memory, disk memory, tape memory, and the like.

The other circuitry 76 represents additional hardware. For example, the other circuitry 76 may include a storage drive (or array) interface to communicate with the storage drives 42 (e.g., SATA, SAS, PCIe, etc.). As another example, the other circuitry 76 may include a user terminal or service processor that enables a human user to control and/or configure the data storage equipment 24, and so on. Further details will now be provided with reference to FIGS. 3 and 4.

Figure 3:
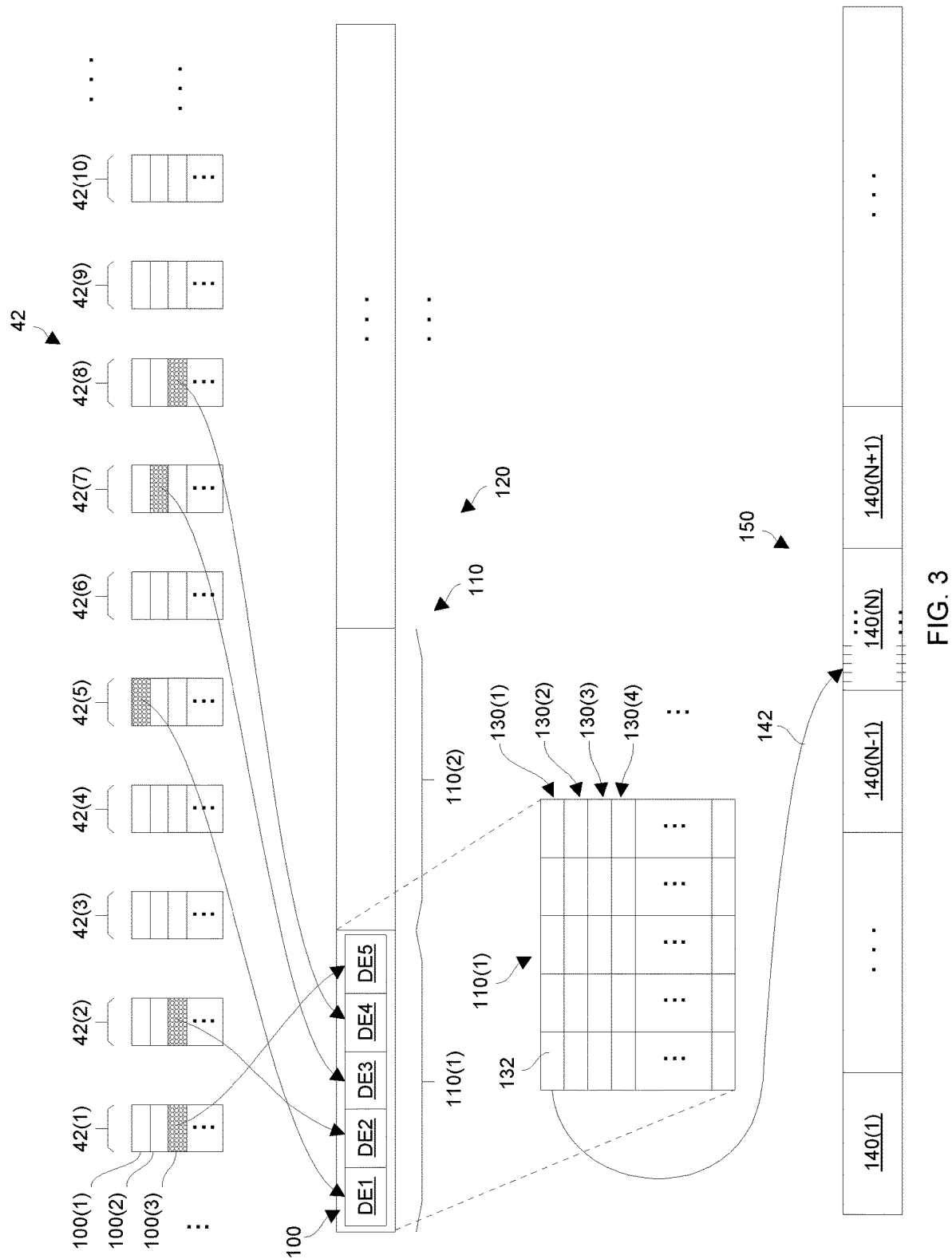
FIG. 3 is a block diagram illustrating particular storage device details of the mapped-RAID environment.
Figure 4:
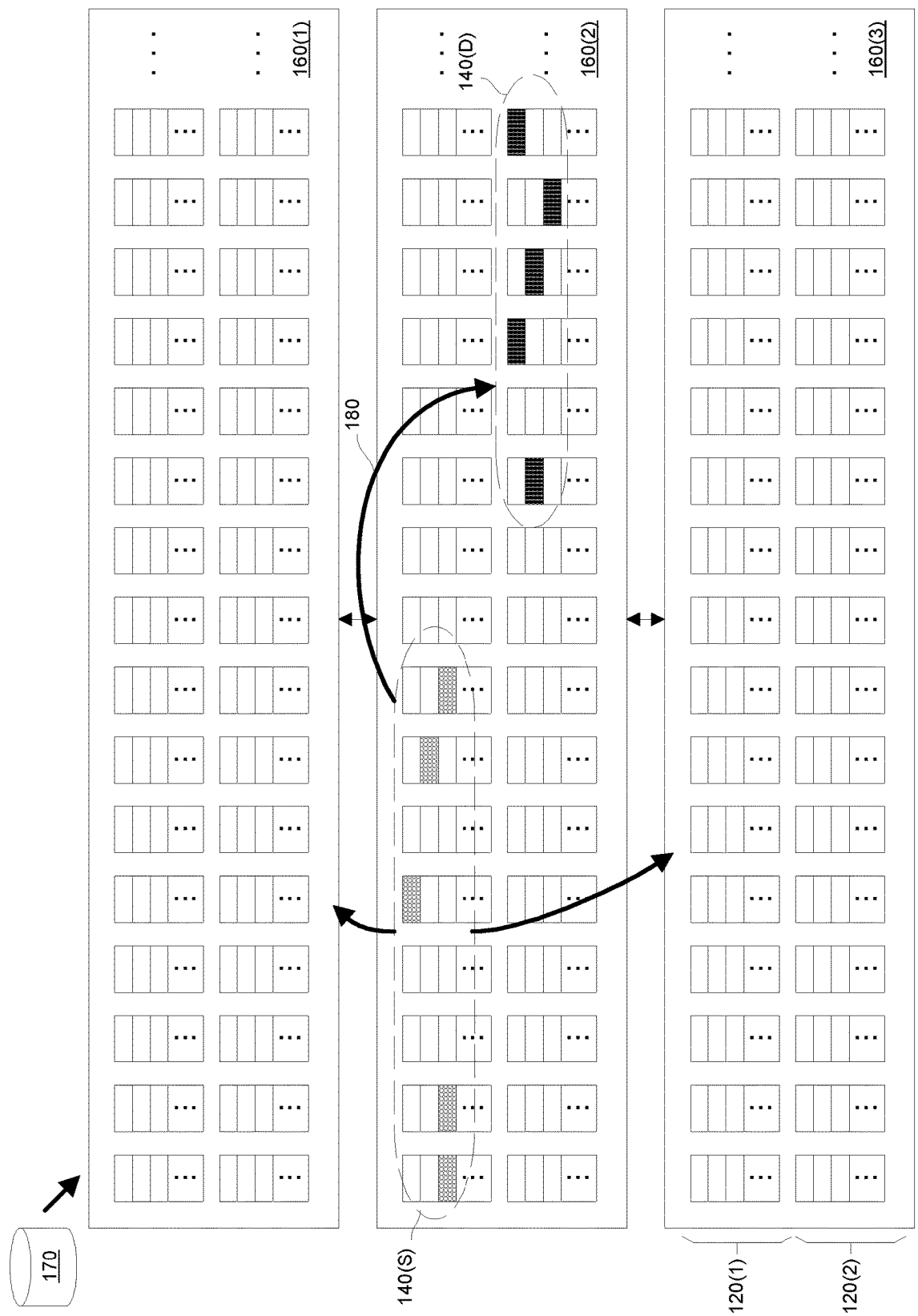
FIG. 4 is a block diagram illustrating particular storage RAID group and tier details of the mapped-RAID environment.

FIGS. 3 and 4 show particular storage details of the mapped-RAID environment 44. FIG. 3 shows particular slice details regarding device extents, RAID extents, stripes, slices, and LUNs. FIG. 4 shows particular slice relocation details.

As shown in FIG. 3, the data storage equipment 24 divides each storage device 42 into multiple device extents 100(1), 100(2), 100(3), . . . (collectively, device extents 100). An example size for each device extent 100 is 1 Gigabyte (GB) although other sizes are suitable for use as well.

The data storage equipment 24 then combines device extents 100 from different storage devices 42 to form RAID extents 110. Each RAID extent 110 includes storage for data and parity such as RAID 4+1 which includes four device extents 100 that hold data and one device extent 100 that holds parity. For example, as shown in FIG. 3, the RAID extent 110(1) is formed by a device extent DE1 from the storage device 42(5), a device extent DE2 from the storage device 42(2), a device extent DE3 from the storage device 42(7), a device extent DE4 from the storage device 42(8), a device extent DE5 from storage the device 42(1). Generally, each storage device 42 that contributes storage to a RAID extent 110 should be of the same type (e.g., all solid state drives of the same capacity and speed, all magnetic drives of the same capacity and speed, etc.).

The data storage equipment 24 combines multiple RAID extents 110(1), 110(2), . . . to form a RAID group 120. By way of example, if the size of each device extent 100 is 1 GB, the size of each RAID extent 110 is 5 GB in a RAID 4+1 implementation. Of course, other RAID implementations and other RAID extent sizes are suitable for use in the mapped-RAID environment 44.

It should be understood that, in the RAID 4+1 example, a RAID group 120 that includes two RAID extents 110 distributes data across a maximum of ten (10) storage devices 42 (i.e., where there are no storage devices 42 in common between the two RAID extents 110). Likewise, in the RAID 4+1 example, a RAID group 120 that includes three RAID extents 110 distributes data across a maximum of fifteen (15) storage devices 42, and so on.

The data storage equipment 24 divides each RAID extent 110 (see the RAID extent 110(1) in FIG. 3) into multiple storage stripes 130(1), 130(2), 130(3), 130(4), . . . (collectively, storage stripes 130). In one RAID 4+1 example arrangement, each storage stripe 130 is capable of holding 320 Kilobytes (KB) of data and parity (e.g., four segments 132 that hold data and one segment 132 that holds parity). In such an example arrangement, the size of each stripe segment 132 is 64 KB.

The data storage equipment 24 then combines multiple storage stripes 130 together to form slices 140(1), . . . 140(N−1), 140(N), 140(N+1), . . . (collectively, slices 140) of a logical unit of storage (LUN) 150. The arrow 142 pointing to a portion of the slice 140(N) delineated by hash marks is intended to illustrate the relationship between a storage stripe 130 and a slice 140. In some arrangements, each slice 140 is 256 MB in size, although other sizes (e.g., 128 MB, 512 MB, 1 GB, etc.) are suitable for use as well.

It should be understood that such a LUN 150 is addressable in that data can be read using offsets (e.g., logical block addresses which are mapped to underlying storage). In some arrangements, such a LUN 150 is thickly provisioned in that actual physical storage from the storage devices 42 supports the entire LUN address space. In other arrangements, such a LUN 150 is thinly provisioned in that physical storage from the storage devices 42 is allocated only upon storage of actual data.

FIG. 4 shows details of how a data of a slice 140 can be relocated to another slice 140. By way of example, the storage devices 42 form multiple storage tiers 160(1), 160(2), 160(3) (collectively, tiers 160). The storage tier 160(1) may include fast storage devices 42 (e.g., solid state devices), the storage tier 160(2) may include moderate speed storage devices 42 (e.g., SAS devices), and the storage tier 160(3) may include slow storage devices 42 (e.g., near-line SAS devices). Other tier arrangements are suitable for the data storage equipment 24 as well such as storage that includes only a single tier 160, only two tiers 160, four tiers 160, and so on.

Additionally, each storage tier 160 includes at least one RAID group 120 (also see FIG. 3). For example, the tier 160(3) includes two distinct RAID groups 120(1) and 120(2). It should be understood that other numbers of RAID groups are suitable for each tier 160 (e.g., one, three, etc.). Moreover, the different tiers 160 may have different numbers of RAID groups 120.

As shown in FIG. 4, the data storage equipment 24 maintains a database 170 that contains a set of statistics that tracks data storage activity of the mapped-RAID environment 44 (also see the data relocation code and data 86 in FIG. 2). Such a database 170 includes storage I/O loading information such as how frequently each storage device 42 is accessed per unit of time such as per day, per hour, etc. Additionally, the database 170 includes wear data such as how many times each storage device 42 has been accessed overall. Furthermore, the database 170 includes heat (or temperature) data indicating how often each data slice 140 of the LUN 150 is accessed per unit of time such as per day, per hour, etc. Other metrics and data are suitable for storing in the database 170 as well such as indications whether each data slice of the LUN 150 is data or metadata, moving averages, predefined thresholds, which device extents 100 form which RAID extents 110, which RAID extents 110 for which RAID groups 120, which storage devices 42 belong to which RAID groups 120, and so on.

In some embodiments, the storage processing circuitry 40 is configured and operative to read wear data from each storage device 42 periodically. Along these lines, the storage processing circuitry 40 obtains the current program-erase (P/E) cycle number and the maximum number of P/E cycles. From this information, the storage processing circuitry 40 is able to ascertain the percentage of wear of each storage device 42 (e.g., the current P/E divided by the maximum number of P/E cycles as a percentage). Additionally, the storage processing circuitry 40 is able to estimate how many cycles are consumed between updates (e.g., the number of P/E cycles consumed since the last time the storage processing circuitry read the wear data, and so on). Other metrics can be obtained, derived, and/or estimated as well.

During operation, the storage processing circuitry 40 selects data within a source slice 140(S) to re-place within the mapped-RAID environment 44 in order to improve loading and wear characteristics. In particular, the storage processing circuitry 40 identifies a source slice 140(S) containing hot data among the other slices 140 based on the database 170 containing the set of statistics that tracks data storage activity (e.g., the most frequently accessed slice 140, a slice 140 having a number of writes that exceeds a predefined write threshold, a slice 140 having a number of accesses that exceeds a predefined access threshold, etc.). In some arrangements, the database 170 includes moving averages, and the storage processing circuitry 40 compares particular slice metrics to one or more of the moving averages in order to identify a candidate source slice 140(S) that stands out from a relative perspective among the other slices 140. Accordingly, the results of such evaluation by the storage processing circuitry 40 may be viewed essentially as predictions as to when source slice activity justifies relocating the slice data.

In some embodiments, the storage processing circuitry selects a destination slice 140(D) within the mapped-RAID environment 44 to be an available slice 140 that is different from the current source slice 140(S). As a result, I/O and wear are balanced statistically. That is, from time to time, the source slice 140(S) moves from one place to another and the corresponding I/O moves with it.

In alternative embodiments, the storage processing circuitry 40 selects a destination slice 140(D) within the mapped-RAID environment 44. Similarly, the storage processing circuitry 40 identifies a destination slice 140(D) among other slices 140 based on the set statistics that tracks data storage activity (e.g., the least frequently accessed slice 140, a slice 140 having a number of writes that is below a predefined write threshold, a slice 140 having a number of accesses that is below a predefined access threshold, etc.). Again, in some arrangements, the storage processing circuitry 40 compares particular slice metrics to one or more moving averages in order to identify, as the destination slice 140(D), a slice 140 that stands out from a relative perspective among the other slices 140.

Once the source slice 140(S) and the destination slice 140(D) have been chosen, the storage processing circuitry 40 relocates data (the shaded portions) from the source slice 140(S) to the destination slice 140(D) (see the arrow 180 in FIG. 4). In particular, the slice data is redistributed among the storage devices 42 based on the set of statistics within the database 170. Such operation statistically rebalances the storage devices 42 in terms of I/O loading and wearing thus reducing overall latency and reducing failures due to premature wear.

Upon relocating the particular data from the source slice 140(S) to the destination slice 140(D), the storage processing circuitry 40 updates a set of address mappings that maps the LUN 150 to actual storage. Accordingly, subsequent I/O operations to access the slice data are no longer directed to the source slice 140(S) but are now directed to the destination slice 140(S).

It should be understood that while host data 32 is moved from a source slice 140(S) to a destination slice 140(D), the host data 32 may be accessed by the set of host computers 22. In particular, the data may be read, modified, written, etc. Accordingly, all changes are eventually reflected in the host data 32 that resides in the destination slice 140(D). Moreover, the storage processing circuitry 40 continues to update the set of statistics within the database 170 so that the database 170 continues to track the data storage activity of the mapped-RAID environment 44.

Furthermore, the storage processing circuitry 40 may impose policies on data relocation. Along these lines, the storage processing circuitry 40 may restrict metadata (e.g., data used by the data storage equipment 24 during operation that is transparent to the host computers 22) to a particular storage tier 160 (e.g., the fastest storage tier 160). Other policies are suitable for use as well.

It should be further understood that such moving of slice data from a source slice 140(S) to a destination slice 140(D) may occur within the same RAID group 120 within the same storage tier 160. Such re-placement of the slice data may be warranted for frequently accessed slice data that resides in a relatively lightly used RAID group 120 or when the data storage system 24 (or the particular storage tier 160) includes only one RAID group 120.

Alternatively, the storage processing circuitry 40 may move slice data from a source slice 140 in one RAID group 120 to a destination slice 140 in a different RAID group 120 within the same storage tier 160. Such re-placement of the slice data may be warranted for frequently accessed slice data that resides a heavily used RAID group 120 in an appropriate storage tier 160 or when the data storage system 24 includes only one storage tier 160.

As yet another alternative, the storage processing circuitry 40 may move slice data from a slice 140 in one RAID group 120 to a slice 140 in a different RAID group 120 within different storage tiers 160. Such re-placement of the slice data may be warranted for frequently accessed slice data that resides a heavily used RAID group 120 in an inappropriate storage tier 160 (e.g., when the slice data should be promoted or demoted due to a chance in access frequency, etc., also see the darkened arrows extending between tiers 160 in FIG. 4).

It should be understood that such moving of data slices may occur in the background and be transparent to the host computers 22 (FIG. 1). Along these lines, such data re-placement may be performed while the data storage equipment 24 concurrently performs I/O operations in response to I/O requests 30 from the host computers 22. For example, such re-placement may take place during idle cycles, period of low data storage activity, during other operations such as data promotion/demotion, combinations thereof, etc. Further details will now be provided with reference to FIG. 5.

Figure 5:
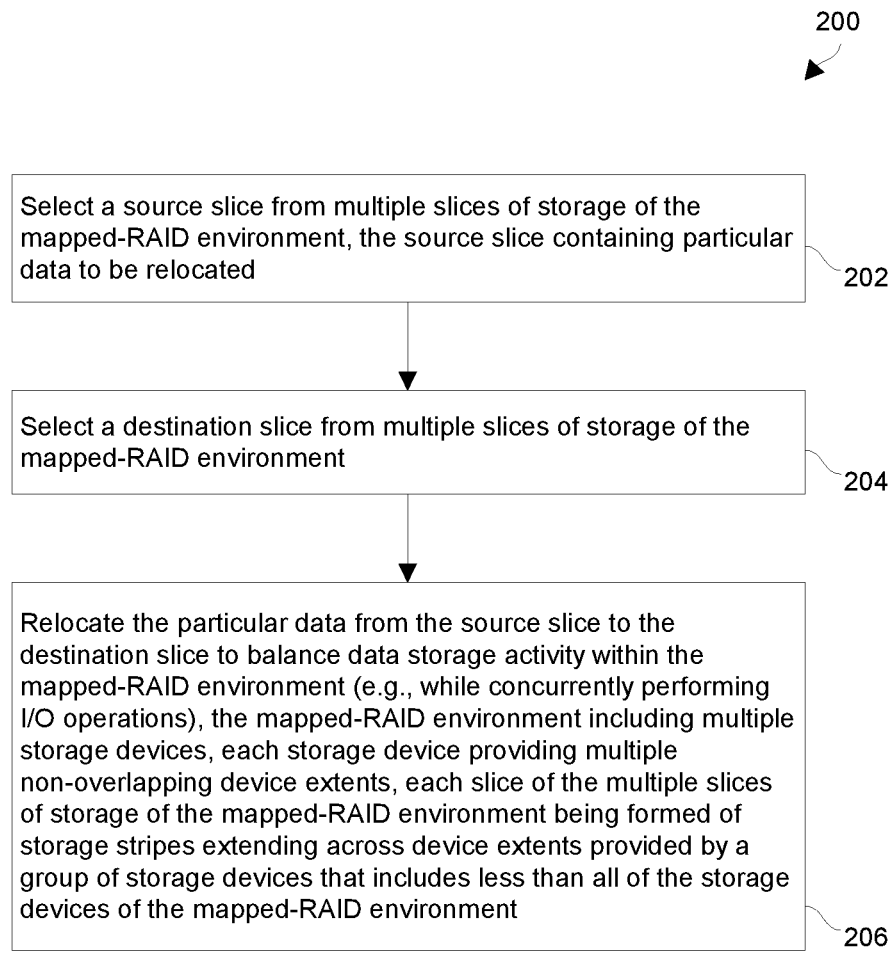
FIG. 5 is a flowchart of a procedure which is performed by the data storage equipment of FIG. 2.

FIG. 5 is a flowchart of a procedure 200 which is performed by the data storage equipment 24. Such a procedure 200 balances data storage activity within a mapped-RAID environment 44.

At 202, the data storage equipment 24 selects a source slice of storage from multiple slices of storage of the mapped-RAID environment. The source slice contains particular data to be relocated. Such selection may be based on an evaluation of historical data storage activity (e.g., also see the database 170 in FIG. 4).

At 204, the data storage equipment 24 select a destination slice of storage from the multiple slices of storage of the mapped-RAID environment. Again, such selection may be based on an evaluation of historical data storage activity.

At 206, data storage equipment 24 relocates the particular data from the source slice to the destination slice to balance data storage activity within the mapped-RAID environment. The mapped-RAID environment includes multiple storage devices. Each storage device provides multiple non-overlapping device extents. Each slice of the multiple slices of storage of the mapped-RAID environment is formed of storage stripes extending across device extents provided by a group of storage devices that includes less than all of the storage devices of the mapped-RAID environment. It should be understood that such operation may take place while host computers 22 access host data within the mapped-RAID environment (i.e., I/O operations are performed concurrently).

As described above, improved techniques are directed to re-placing (or relocating) data within a mapped-RAID environment 44 to provide improved I/O load and wear balancing among storage devices 42. In particular, such techniques identify imbalances (e.g., heavily accessed slices of data) and move the imbalances among the storage devices 42 of the mapped-RAID environment 44 (e.g., redistribute the heavily accessed slices of data). Such operation statistically balances the storage devices 42 in terms of I/O performance and wearing thus reducing overall latency and reducing failures due to premature wear.

One should appreciate that the above-described techniques do not merely read/write data. Rather, the disclosed techniques involve improvements to the technology of data storage. For example, such techniques improve data access speeds by balancing I/O activity across multiple storage devices 42. Additionally, such techniques reduce the chance of encountering an unexpected storage device failure due to earlier than anticipated wear on a particular storage device 42, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage setting 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of balancing data storage activity within a mapped-RAID (redundant array of independent disk) environment, the method comprising:
    selecting, by processing circuitry, a source slice of storage from multiple slices of storage of the mapped-RAID environment, the source slice containing particular data to be relocated;
    selecting, by the processing circuitry, a destination slice of storage from the multiple slices of storage of the mapped-RAID environment; and
    relocating, by the processing circuitry, the particular data from the source slice to the destination slice to balance data storage activity within the mapped-RAID environment, the mapped-RAID environment including multiple storage devices, each storage device providing multiple non-overlapping device extents, each slice of the multiple slices of storage of the mapped-RAID environment being formed of storage stripes that are formed from RAID extents extending across device extents provided by a group of storage devices that includes less than all of the storage devices of the mapped-RAID environment.

2. A method as in claim 1, further comprising:
    prior to selecting the source slice and the destination slice, performing a set of input/output (I/O) operations that accesses the particular data while the particular data resides in the source slice and updating, in response to performing the set of I/O operations, a set of statistics that tracks data storage activity of the mapped-RAID environment.

3. A method as in claim 2 wherein selecting the source slice of storage from the multiple slices of storage of the mapped-RAID environment includes:
    identifying the source slice among other slices of the mapped-RAID environment based on the set of statistics that tracks data storage activity of the mapped-RAID environment indicating that the source slice has experienced higher data storage activity than the other slices of the mapped-RAID environment.

4. A method as in claim 3 wherein selecting the destination slice of storage from the multiple slices of storage of the mapped-RAID environment includes:
    identifying the destination slice among the other slices of the mapped-RAID environment based on the set of statistics that tracks data storage activity of the mapped-RAID environment indicating that the destination slice has experienced less data storage activity than the other slices of the mapped-RAID environment.

5. A method as in claim 4, further comprising:
    while performing the set of I/O operations that accesses the particular data while the particular data resides in the source slice, maintaining an initial set of address mappings that map a portion of a logical unit of storage (LUN), which is addressable by a set applications, to the source slice.

6. A method as in claim 5, further comprising:
    upon relocating the particular data from the source slice to the destination slice, maintaining a subsequent set of address mappings that map the portion of the LUN to the destination slice.

7. A method as in claim 6, further comprising:
    after relocating the particular data from the source slice to the destination slice, performing another set of I/O operations that accesses the particular data while the particular data resides in the destination slice, and updating the set of statistics that tracks data storage activity of the mapped-RAID environment in response to performing the other set of I/O operations.

8. A method as in claim 7 wherein performing the set of I/O operations that accesses the particular data while the particular data resides in the source slice includes addressing, by the set of applications, the portion of the LUN using block addresses; and
    wherein performing the other set of I/O operations that accesses the particular data while the particular data resides in the destination slice includes addressing, by the set of applications, the portion of the LUN using the same block addresses that the set of applications used to address the particular data while the particular data resided in the source slice.

9. A method as in claim 8, further comprising:
    performing other I/O operations that access data within the LUN while identifying the source slice, identifying the destination slice and relocating the particular data from the source slice to the destination slice.

10. A method as in claim 9 wherein performing the other I/O operations that access the data within the LUN includes:
    accessing the particular data on behalf of a set of host computers while the particular data is being relocated from the source slice to the destination slice.

11. A method as in claim 4 wherein identifying the source slice among the other slices of the mapped-RAID environment based on the set of statistics includes:
    generating a first prediction that the source slice will encounter a future access behavior that exceeds a predefined high access threshold, and
    choosing the source slice among the other slices in response to the first prediction; and
    wherein identifying the destination slice among the other slices of the mapped-RAID environment based on the set of statistics includes:
    generating a second prediction that the destination slice will encounter a future access behavior that is below a predefined low access threshold, and
    choosing the destination slice among the other slices in response to the second prediction.

12. A method as in claim 4 wherein identifying the source slice among the other slices of the mapped-RAID environment based on the set of statistics includes:

choosing the source slice among the other slices in response to a total number of write operations to the source slice exceeding a first predefined write cycle threshold; and wherein identifying the destination slice among the other slices of the mapped-RAID environment based on the set of statistics includes:

choosing the destination slice among the other slices in response to a total number of write operations to the destination slice being below a second predefined write cycle threshold.

13. A method as in claim 4 wherein identifying the source slice among the other slices of the mapped-RAID environment based on the set of statistics includes:

generating a first prediction that the source slice will encounter a future access behavior that exceeds a predefined high access threshold, and choosing the source slice among the other slices in response to the first prediction and a total number of write operations to the source slice exceeding a first predefined write cycle threshold; and wherein identifying the destination slice among the other slices of the mapped-RAID environment based on the set of statistics includes:

generating a second prediction that the destination slice will encounter a future access behavior that is below a predefined low access threshold, and choosing the destination slice among the other slices in response to the second prediction and a total number of write operations to the destination slice being below a second predefined write cycle threshold.

14. A method as in claim 1 wherein the source slice is formed from a first RAID extent that is formed by a first group of device extents, each device extent of the first group residing on a different storage device of the mapped-RAID environment;

wherein the destination slice is formed from a second RAID extent that is formed by a second group of device extents, each device extent of the second group residing on a different storage device of the mapped-RAID environment; and wherein the first group of device extents reside on a first group of storage devices, the second group of device extents reside on a second group of storage devices, and there is at least one storage device of the second group of storage devices that does not belong to the first group of storage devices.

15. A method as in claim 14 wherein none of the second group of storage devices belongs to the first group of storage devices.

16. A method as in claim 14 wherein the mapped-RAID environment includes multiple RAID groups; and wherein the first RAID extent and the second RAID extent reside within the same RAID group.

17. A method as in claim 14 wherein the mapped-RAID environment includes multiple RAID groups;

wherein the first RAID extent resides within a first RAID group which is formed by a first group of RAID extents;

wherein the second RAID extent resides within a second RAID group which is formed by a second group of RAID extents; and wherein none of the RAID extents of the second group of RAID extents belongs to the first group of RAID extents.

18. A method as in claim 14 wherein the mapped-RAID environment includes multiple storage tiers, each storage tier being formed by multiple storage devices and providing a different access speed behavior;

wherein the first RAID extent resides within a first storage tier;

wherein the second RAID extent resides within a second storage tier that is different from the first storage tier.

19. A method as in claim 1, further comprising:

prior to relocating the particular data, providing a set of host computers with input/output (I/O) access to the particular data from a first set of storage devices, of the mapped-RAID environment, that forms the source slice; and after relocating the particular data, providing the set of host computers with I/O access to the particular data from a second set of storage devices, of the mapped-RAID environment, that forms the destination slice, the first set of storage devices and the second set of storage devices including a same number of storage devices.

20. A method as in claim 1 wherein a first slice and a second slice form at least a portion of a RAID group that includes other storage devices that are not used by the first slice and the second slice.

21. Data storage equipment, comprising:

a communications interface;

memory including a mapped-RAID (redundant array of independent disk) environment having multiple storage devices, each storage device providing multiple non-overlapping device extents; and control circuitry coupled to the communications interface and the memory, the memory storing instructions which, when carried out by the control circuitry, cause the control circuitry to:

select a source slice of storage from multiple slices of storage of the mapped-RAID environment, the source slice containing particular data to be relocated, select a destination slice of storage from the multiple slices of storage of the mapped-RAID environment, and relocate the particular data from the source slice to the destination slice to balance data storage activity within the mapped-RAID environment, each slice of the multiple slices of storage of the mapped-RAID environment being formed of storage stripes that are formed from RAID extents extending across device extents provided by a group of storage devices that includes less than all of the storage devices of the mapped-RAID environment.

22. A computer program product having a non-transitory computer readable medium which stores a set of instructions to balance data storage activity within a mapped-RAID (redundant array of independent disk) environment; the set of instructions, when carried out by computerized circuitry, causing the computerized circuitry to perform a method of:

selecting a source slice of storage from multiple slices of storage of the mapped-RAID environment, the source slice containing particular data to be relocated;

selecting a destination slice of storage from the multiple slices of storage of the mapped-RAID environment; and relocating the particular data from the source slice to the destination slice to balance data storage activity within the mapped-RAID environment, the mapped-RAID environment including multiple storage devices, each storage device providing multiple non-overlapping device extents, each slice of the multiple slices of storage of the mapped-RAID environment being formed of storage stripes that are formed from RAID extents extending across device extents provided by a group of storage devices that includes less than all of the storage devices of the mapped-RAID environment.

\* \* \* \* \*